(12) United States Patent
Therrien et al.

(10) Patent No.: US 11,287,070 B2
(45) Date of Patent: Mar. 29, 2022

(54) SEALING CONNECTOR FOR FLUID COLLECTION SYSTEMS

(71) Applicant: MI INTÉGRATION S.E.N.C., Sherbrooke (CA)

(72) Inventors: Jean Therrien, Sherbrooke (CA); Gabriel Turcotte, Sherbrooke (CA); Nicolas Nadeau, Sherbrooke (CA)

(73) Assignee: MI INTÉGRATION S.E.N.C., Sherbrooke (CA)

( * ) Notice: Subject to any disclaimer, the term of this patent is extended or adjusted under 35 U.S.C. 154(b) by 109 days.

(21) Appl. No.: 16/801,967

(22) Filed: Feb. 26, 2020

(65) Prior Publication Data

US 2020/0271258 A1 Aug. 27, 2020

Related U.S. Application Data

(60) Provisional application No. 62/811,189, filed on Feb. 27, 2019.

(51) Int. Cl.
*F16L 33/30* (2006.01)
*F16L 33/18* (2006.01)
*F16L 33/035* (2006.01)

(52) U.S. Cl.
CPC .............. *F16L 33/30* (2013.01); *F16L 33/18* (2013.01); *F16L 33/035* (2013.01)

(58) Field of Classification Search
CPC .......... F16L 33/18; F16L 33/30; F16L 33/213; F16L 31/00
USPC ......................................................... 285/239
See application file for complete search history.

(56) References Cited

U.S. PATENT DOCUMENTS

| | | | | |
|---|---|---|---|---|
| 531,578 A * | 12/1894 | Van Dyke | ............... | F16L 33/30 285/239 |
| 585,014 A * | 6/1897 | Wenzel | ................... | F16L 33/30 285/239 |
| 1,994,784 A * | 3/1935 | Porzel | ..................... | F16L 31/00 285/239 |
| 4,537,183 A * | 8/1985 | Fogarty | | |
| 5,017,182 A * | 5/1991 | Mabie | ........................... | 285/239 |
| 5,425,739 A * | 6/1995 | Jessen | | |
| 5,853,203 A * | 12/1998 | Crandall | ................. | F16L 33/30 |
| 6,010,162 A | 1/2000 | Grau et al. | | |
| 8,628,118 B2 | 1/2014 | Bobenhausen | | |
| 2009/0227954 A1* | 9/2009 | Loiterman | .............. | F16L 33/30 |

\* cited by examiner

*Primary Examiner* — Zachary T Dragicevich
(74) *Attorney, Agent, or Firm* — Ware, Fressola, Maguire & Barber LLP

(57) ABSTRACT

The present disclosure relates to connectors for connecting resilient collecting tubes in fluid collection systems. The connectors comprise sealing elements to prevent leakages such as air leakage in fluid collection systems operating under vacuum.

18 Claims, 5 Drawing Sheets

SEALING CONNECTOR FOR FLUID COLLECTION SYSTEMS

CROSS-REFERENCE TO RELATED APPLICATIONS

This application claims benefit to provisional patent application Ser. No. 62/811,189, filed 27 Feb. 2019, which is hereby incorporated by reference in its entirety.

TECHNICAL FIELD

This invention relates generally to connectors for fluid collection systems. More specifically, this invention relates to connectors for the connection of collecting tubes in a fluid collection system operating under vacuum.

BACKGROUND

Air and fluid leakages in fluid collecting systems operating under vacuum, such as in sap collection operations, are a common problem. Leaks typically originate at multiple points along the conduits (tubing) used to collect the fluid. In sap collection, key points include the connection of the tubing at the spout and tubing connectors along the collecting lines. The loss of vacuum because of these leaks results in significantly lower yield of sap collection and puts a strain on the vacuum generator. Furthermore, in sap collection systems, leakage points can result in infiltration of contaminating bacteria which can be damaging to the trees as well as compromising the quality of the collected sap.

The reasons for the leaks at these critical points are numerous. One important cause is the loss of resiliency of the sap collecting tube over time. The collecting tubes are resilient when they are first attached to the connector. Their resiliency enables the tube to espouse to a certain extent the shape of the connector and its retention means such as barbs. This close conformation with the profile of the connector initially results in a relatively good seal. However, the resiliency of the collecting tubes is typically altered over time as a result of physico-chemical modifications triggered by environmental factors such as temperature variations, sun generated UV radiation and changes in atmospheric humidity. These alterations lead to a loss of resiliency. As a result, the collecting tubes become quite rigid. They become more or less "frozen" in the original conformation they adopted when first inserted over the connector. Therefore, the normal seal created by the constriction of the relatively resilient collecting tube over the hard connector is lost or significantly diminished.

Connectors are not perfectly symmetrical structures. For example, barbs on spouts, even though they appear perfectly round, are oval to a certain degree. Therefore, even a small displacement of an older tube over the connector can result in the creation of significant zones of air leakage (loss of sealing efficiency) because of the inability of the older, now more rigid, tube to espouse the contour of the connector and associated retention structures. In sap collection systems displacement of tubes are frequent as a result of falling branches, wind, snow and rain falls, small animals' activities and even temperature changes.

Also, the manufacture of connectors, which are made by injection molding processes, results in the creation of small imperfections on their surface. For example, one such imperfection is known as a parting line. The parting line results from the injection molding process which combines two cavities each molding one half of the connector. A small zone of "flash" or excess plastic forms at the intersection of the cavities creating the parting line. The parting line is visible to the naked eye but is quite small compared to the spout dimensions. Nevertheless, it is enough to create damage (micro fissures) to the internal surface of the collecting tube when it is inserted on the spout or connector. In turn, these micro fissures are enough to create vacuum leaks.

The above described deficiencies are compounded by the fact that they synergistically contribute to leaks. For example, the presence of micro fissures will compound the leak created by the displacement of an irregularly shaped, aged tube on the connector or spout.

The problem is further compounded by the necessity to improve the seal between tube and connector while minimizing the potential slipping of the tube off the connector. Thus, the presence of tube retention structures on connectors, such as barbs, sometimes worsen the leakage problem and impedes the design of a seal that does not interfere with the ease of tube installation and the maintenance of a good seal without having to clamp with a collar for example.

There is therefore a need to provide improve sealing in such fluid collection systems operating under vacuum.

SUMMARY OF THE INVENTION

A connector in a fluid collection system for fluidly connecting a resilient collecting tube thereto, the connector comprising: one or more fluid receiving end and one or more fluid efflux end fluidly connected through a connector body comprising a conduit having a long axis and an outer diameter, at least one of said one or more fluid receiving end and one or more fluid efflux end is a resilient collecting tube coupling end comprising a resilient collecting tube retention structure having at least one resilient collecting tube diameter expanding member comprising a retention edge, wherein the at least one resilient collecting tube diameter expanding member has a diameter, at the retention edge, greater than the outer diameter of the connector body, the resilient collecting tube adopting a constricting curvature on either side of the retention edge, a resilient sealing member, first and second sealing flanges to position the sealing member therebetween and having relative heights configured to define a sloping sealing line of contact that forms a sealing angle with the long axis of the conduit and enables the resilient collecting tube to sealingly compress the resilient sealing member along the sloping sealing line of contact to form a sealing contact zone and whereby the tube is free to engage the retention edge to form a retention coupling.

BRIEF DESCRIPTION OF THE DRAWINGS

The invention will be better understood by way of the following detailed description of embodiments of the invention with reference to the appended drawings, in which.

DETAILED DESCRIPTION

There is provided a connector for resilient collecting tubes of the type used in fluid collecting systems, for example in sap collecting systems, and especially systems operating under vacuum, that enables the formation of a seal, particularly a seal against air leakage, despite tubes and connector alterations and the limitations of the connector design mentioned above.

The connector is generally used to interconnect tubing or to connect tubing to a fluid source. The connector of the present invention can be adapted to any fluid collection system. One example where such connectors are useful is sap collection from trees such as maple trees. In the case of sap collecting, the connector can be a connector joining two or more collecting tubes along the tubing network of an entire sap collection system such as a "T" or an elbow connector for example or a spout as shown in an exemplary embodiment in FIG. 1.

Figure 1:
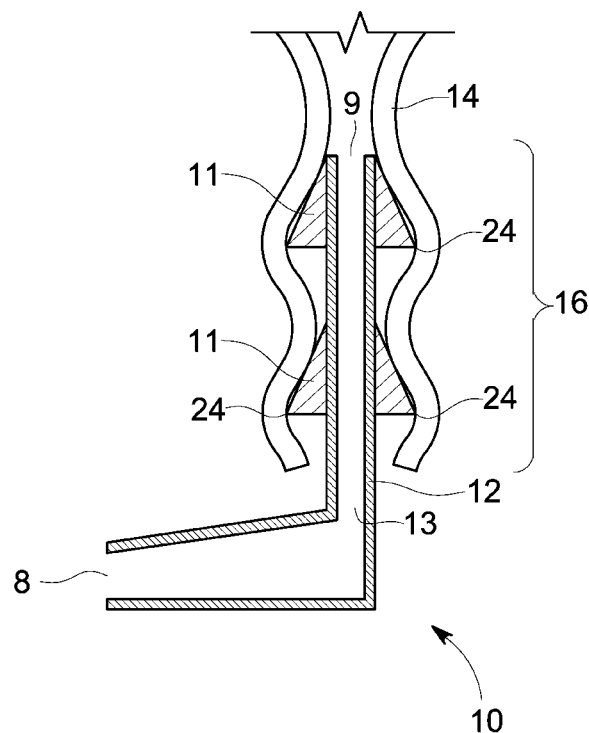
FIG. 1 is a cross-section view of a prior-art connector.

FIG. 1 is a cross section of a typical prior art connector. The connector 10 generally comprises at least two ends that are fluidly connected by a conduit 13 in a connector body 12 to allow the fluid to transit therein. There is at least one resilient collecting tube coupling end 16 comprising retention structure(s) adapted to retain the resilient collecting tube 14 once inserted. The conduit 13 has a long axis in the at least one resilient collecting tube coupling end 16. It will be appreciated that there can be more than one resilient collecting tube coupling end 16 as for example on a "T" connector.

The resilient tube connecting end 16 comprises an opening 9 through which liquid either enters or effluxes and at least a first retention structure between the opening 9 and an opening 8 at a second end which may also be a resilient tube connecting end or an end that is directly coupled to the liquid source, such as the part of a spout inserted in a tree.

The retention structures on connectors of the invention comprises at least a first resilient tube diameter expanding member 11 having a retention edge 24 and a diameter greater than the outer diameter of the connector body. Preferably the retention edge is at or near the greatest diameter of the resilient tube expanding member 11.

Figure 2:
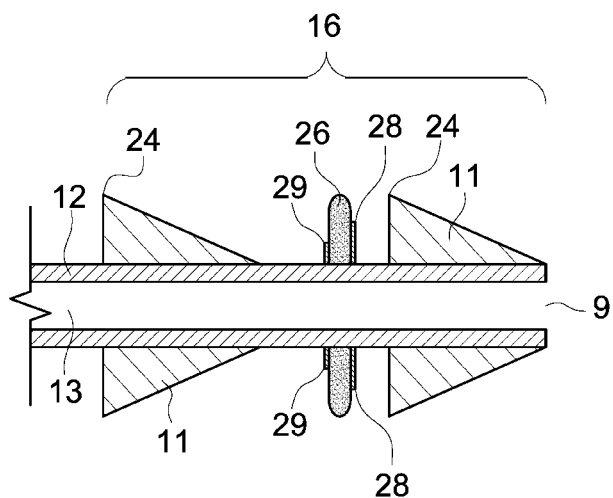
FIG. 2 is a cross-section view of a connector in accordance with an embodiment of the invention.
Figure 3:
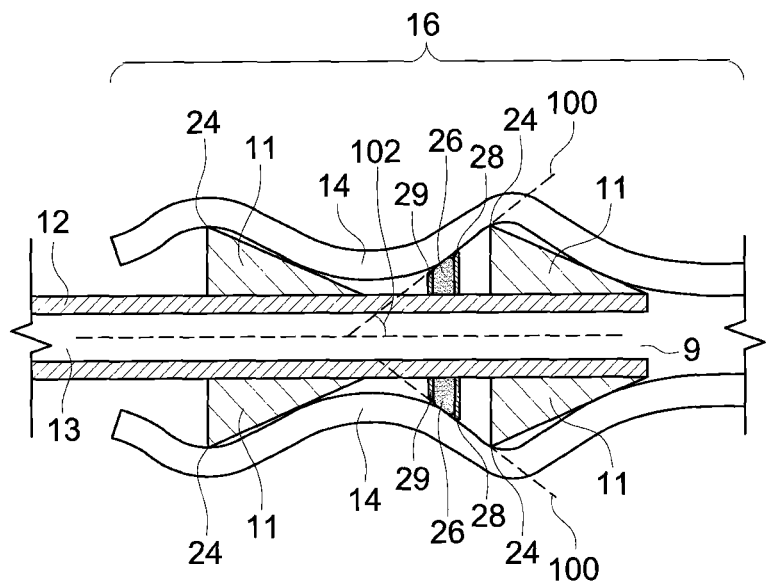
FIG. 3 is a cross-section view of a connector in accordance with another embodiment of the invention.

Referring now to FIG. 2, where an embodiment of the invention is illustrated, a sealing member 26 is located after the first resilient collecting tube diameter expanding member 11 (nearest, or proximal, opening 9). The sealing member is a resilient sealing member that is compressed by the resilient collecting tube 14 to form a sealing contact zone when the tube has been inserted over the collecting tube coupling end 16 as shown in FIG. 3. The connector further comprises sealing flanges 28 and 29 housing the sealing member therebetween and that sealingly collaborate with the resilient collecting tube to compress the sealing member into a sealing position defining a sloping sealing line of contact 100 (FIG. 3). The dimensions and position of the sealing flanges are designed to provide efficient sealing without interfering with the function of the retention edge 24. The sealing flanges can also serve as a sealing member positioning means.

The sealing flanges can have unequal heights defining a sealing flanges slope that substantially matches the sealing line of contact. The sealing line of contact preferably substantially matches the constricting radius of curvature that the resilient collecting tube 14 adopts on either side of the maximum diameter of a resilient collecting tube diameter expanding member 11 as a result of its resilient property.

The sealing line of contact 100 forms a sealing angle 102 with the long axis of conduit 13 that is preferably equal or less than the sealing angle that would be formed by the line tangent to the retention edge 24 and the top of sealing flange 29 causing constriction to maximise the sealing force exerted on the sealing member 26 by the resilient collecting tube 14 while minimizing any interference with the retention function of retention edge 24. It will be appreciated however that departure from tangential alignment may result in acceptable sealing and retention of the resilient collecting tube 14 depending on the size and physico-chemical properties of the components.

By retention edge causing constriction it is meant that each resilient collecting tube diameter expanding member 11 causes the resilient collecting tube 14 to constrict on either side of its greatest diameter up to the section where the resilient collecting tube is close to or touches the connector body 12. At which point the tube has more or less constricted back to its original diameter. Thus, each of these constricting sections is associated with a resilient collecting tube diameter expanding member 11.

It has been found that given the resiliency and hardness characteristics of collecting tubes, especially tubes used in sap collection systems, the arrangement of the sealing flanges of the present invention advantageously solve the leakage problems described in the background section of the present description. Without wishing to be bound by theory and in one embodiment the unequal height of the sealing flanges 28 and 29 is configured to take advantage of the lateral force exerted by the bending or constricting of the resilient collecting tube 14 beyond the retention edge 24 to create a sealing line of contact between the tube and the resilient sealing member 26 that substantially follows the sealing flanges slope, defined by the line joining the top of each flange, while minimally interfering with the retention force at the retention edge. It will be appreciated however that the sealing flanges may have equal or nearly equal heights when the resilient sealing member is positioned in a section where the resilient collecting tube has constricted back to or near its normal diameter. In one embodiment, the expression "nearly equal" means a height variation of +/−0.5%. In another embodiment, the expression "nearly equal" means a height variation of +/−1%. In yet another embodiment, the expression "nearly equal" means a height variation of +/−2%.

The part of the higher flange 28 which exceeds the height of the lower flange 29 provides lateral sealing support for the resilient sealing member, part of which is laterally compressed by the angled force exerted by the curved resilient collecting tube towards flange 28 in addition to the downward force.

To provide a proper sealing, the reciprocal sealing force between the sealing member 26 and the resilient collecting tube 14 has to be sufficient. The sealing flanges configuration of the invention enables the use of a sealing member that is soft enough to avoid creating interference with the retention function of the retention edge 24 while optimizing the biasing sealing force of the resilient collecting tube on the sealing member.

Figure 4:
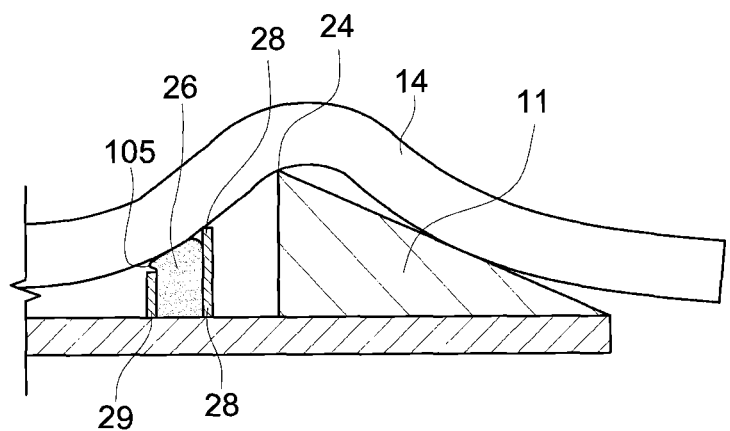
FIG. 4 is a cross-section view of a connector in accordance with another embodiment of the invention.

The unequal height of the flanges may also create additional space 105 (as shown in the embodiment depicted in FIG. 4) allowing the sealing member to expand within this space enabling the part of the resilient sealing member closer to the retention edge 24 to be downwardly compressed more than would otherwise be possible thereby minimizing interference with the retention edge. The extent of the space 105 and expansion of the resilient sealing member therein depends on the relative heights of the flanges, the curvature of the resilient collecting tube and the compressibility of the resilient sealing member. This resilient sealing member expansion space creating structure is particularly advantageous for positioning the sealing member close to the retention edge where the biasing force exerted by the constricting resilient collecting tube is higher due to the more pronounced curvature.

While the top of the sealing flanges 28 and 29 are shown as flat, will be appreciated that they can also have a sloped top, in the direction of the curvature of the tube for example, to optimize the sealing.

Figure 5:
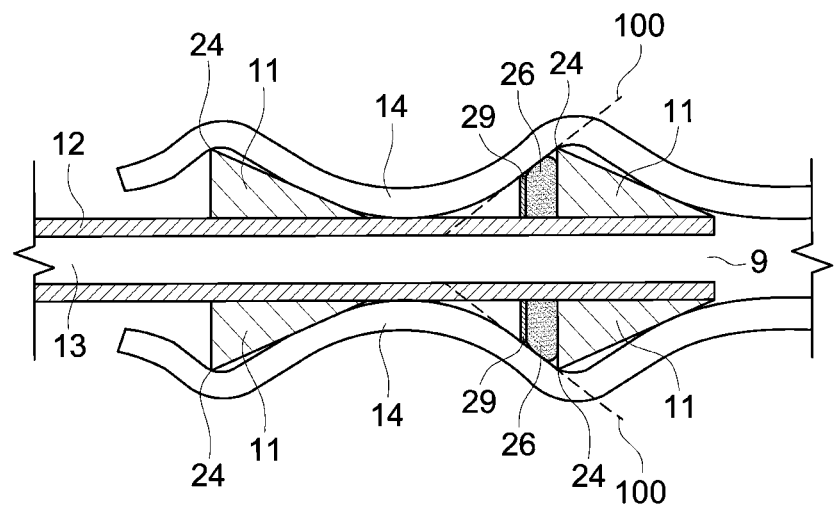
FIG. 5 is a cross-section view of a connector in accordance with another embodiment of the invention.
Figure 6:
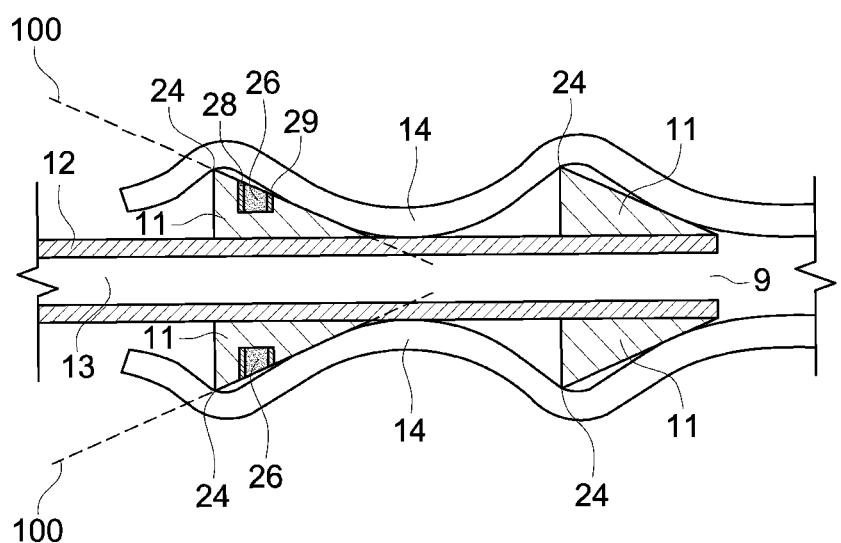
FIG. 6 is a cross-section view of a connector in accordance with another embodiment of the invention.

It will be further appreciated that several embodiments are possible. For example, the resilient collecting tube diameter expanding member 11 can serve as one of the sealing flanges as shown in FIG. 5. Also, there can be more than one resilient collecting tube diameter expanding member and more than one sealing member with associated sealing flanges. The sealing member 26 and the sealing flanges may also be imbedded in the resilient collecting tube diameter expanding member as shown in FIG. 6.

Figure 7:
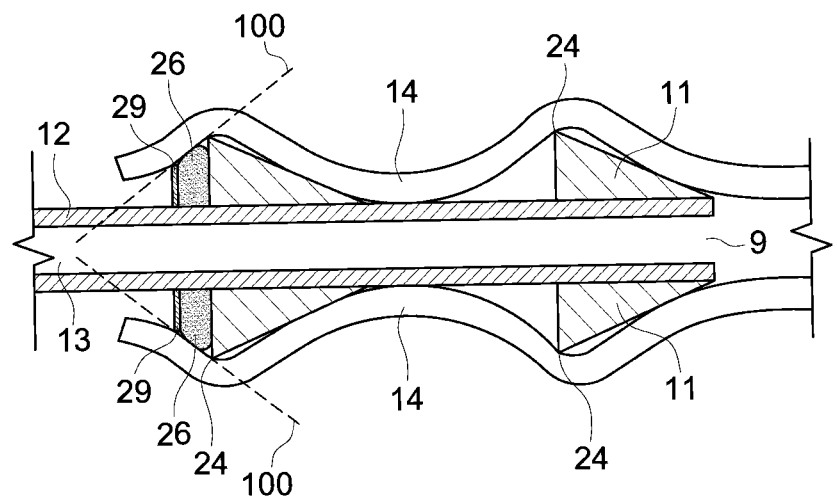
FIG. 7 is a cross-section view of a connector in accordance with another embodiment of the invention.

The sealing member 26 may also be located after the last resilient collecting tube diameter expanding member 11 as shown in FIG. 7. Alternatively, any combination of several resilient sealing members/sealing flanges, in accordance with the present invention, may be disposed at several locations along the connector.

Now referring back to FIG. 3, a schematic representation of an exemplary connector is shown in which the retention structure or resilient collecting tube diameter expanding members 11 are barbs. It will be appreciated that there can be any number of retention structures depending on their size, size of the connector, size of the tube and its degree of resiliency and the like. The collecting tube 14, which is resilient (metallocene or PVC for example), espouses or conforms to a certain extent the profiled shape of the connector created by the resilient collecting tube diameter expanding members 11. This creates a retention edge or retention point 24 at the edge(s) of the retention structure. This retention edge prevents the tube from slipping off the connector after its insertion over the tube coupling end while allowing a seal to be formed with a sealing member as will be further explained below. The connector 10 of the present invention provides an excellent seal without the need for any external clamp or tie. The connector 10 is thus quick to install and dismantle, which is particularly important when operating in cold or harsh climates and/or when spouts are inserted into trees in high or awkward locations.

The barb(s) functions like a normal barb by expanding the diameter of the tube and, once inserted, the part of the tube beyond the retaining barb, that is to say in the direction of tube insertion, regains at least part of its original dimensions (i.e. constricts) such that its internal diameter is less than the greatest diameter of the barb. This constriction on either side of the greatest diameter of the barb provides the friction and biasing force against the retention edge necessary to prevent the tube from slipping off the connector. The retention is sufficient so that no external tube clamp is required around the outer surface of the tube to hold the tube on the connector, thereby expediting attachment of the tube to the connector and otherwise facilitating the manipulation of tube and connector.

The one or more sealing member 26 is a resilient sealing member and together with the sealing flanges is configured and adapted to resiliently and sealingly contact the sealing flanges and the inside surface of the collecting tube 14 to form the seal while allowing the resilient tube to contact the retention edge 24 thereby minimizing any impact on the function of the retention structures.

The sealing arrangement of the sealing flanges and resilient sealing member is also configured to minimize any interference with the insertion of the tube over the resilient collecting tube coupling end.

Referring back to the embodiment of FIG. 3, the resilient sealing member 26 is located between the barbs in which one of the barbs is proximal to opening 9 and one is distal. The interior surface of the resilient collecting tube 14, when inserted on the connector, engages the resilient sealing member 26 and constricts to return nearly to its original diameter, after being expanded by the barb. Thus, resilient collecting tube 14 applies a sealing compression force on the resilient sealing member 26. The sealing flanges, comprising sealing flange 28 adjacent to the proximal barb and sealing flange 29 distant to the proximal barb, also contribute to the sealing by providing a force counteracting the compression or flattening of the sealing member 26 such that the sealing line of contact 100 is sufficiently aligned with the curvature of the collecting tube to provide a sufficient seal without interfering with the function of retention edge 24. The resilient sealing member 26 is compressed by the collecting tube against the sealing flanges. The position and dimension of the flanges together with the compression force of the collecting tube 22 are configured to create a sealing line of contact 100 without interfering with the retention of the collecting tube by the one or more retention structures.

The sealing member 26 may also be positioned after the last retaining structure (after distal barb for example) as shown in FIG. 7. In yet another embodiment, there may be more then one sealing member. For example, there can be two sealing members: One sealing member is placed between the proximal and distal barb and the other after the distal barb.

In yet another embodiment the resilient sealing member 26 can be positioned on the ascending slope of a barb as shown in FIG. 6. In such case the sealing flanges can both be integrally formed by the barb. The slope of the barb may serve to create sealing flanges of unequal height. Alternatively, sealing flanges can be inserted in the barb.

The resilient sealing member 26 is primarily maintained in position by the sealing flanges. However, additional structures can be used to place and maintain the sealing member in position or within a certain range of optimal positions by a positioning means such as a groove, a wall or a housing or a combination thereof on the connector body 12. The positioning means may either consist of or comprise the sealing flanges.

The number and size of retention structures is dependent of the size of the connector, size of the tube, degree of resiliency of the tube and the like.

The retention edges or points 24, which are at an elevation relative to the connector body, create a bending or curvature of the resilient collecting tube. The greater the bending or curvature the better the retention of the tube on the connector. The degree of curvature is dictated by the degree of resiliency of the tube and the relative elevation of the retention points.

When the tube is being inserted it exerts a displacement force on the sealing member 26 towards the distal barb, but this displacement is limited by the sealing flange 29. Similarly, adjustments of the final tube position may require some "wiggling" back and forth of the tube which may cause the sealing member 26 to move towards the proximal barb, however the sealing flange 28, adjacent to the proximal barb, prevents this movement. In this regard, the friction forces generated by the displacement of the resilient collecting tube 14 on the resilient sealing member 26 as a result of the insertion of the collecting tube should be minimized while retaining the characteristics for a good sealing in the context of the present invention. Among the factors affecting the friction forces are the textures of the tube and the sealing member. In other words, the resilient sealing member 26 preferably possesses anti-adhering properties towards the collecting tube 14. This characteristic is also advantageous to favor the conformation of the resilient sealing member with the collecting tube when the latter is displaced or its shape modified as a result of the adverse conditions while in operation.

Preferably the resilient sealing member 26 is positioned to take maximum advantage of the resilient properties of the tube to exert a sealing pressure on the sealing member. For example, the constriction of the tube that occurs between two retention points, on two retaining structures such as the two barbs of FIG. 3 (the resilient sealing member is shown in a compressed state in FIG. 3). In another example the constriction of the tip of the resilient tube after the last retention structure (such as the distal barb as shown in FIG. 7) can also create enough sealing pressure on the sealing member.

It will be appreciated that the dimensions of the resilient sealing member can be adapted to optimize the seal and that this optimization may depend on several factors such as the degree of resiliency of the tube and of the sealing member, the material of which the tube is made, the dimensions of the retention structure(s), the space between retention structure and the like. The material comprising the sealing member also contributes to the efficiency of the sealing.

In one embodiment the sealing member is an O-ring and is made of silicone. Other resilient materials include, without being limited to, polytetrafluoroethene (Teflon™), Butyl Rubber (IIR); Ethylene propylene rubber (EPR, EPDM, EP, EPT); Fluoroelastomer (FKM); Fluorosilicone (FVMQ, FMQ, FPM, FSI); Nitrile Rubber (NBR, HNBR, HSN); Polychloroprene (CR-Neoprene); Polytetrafluoroethylene (PTFE); Silicone Rubber; Styrene Butadiene Rubber (SBR), thermoplastic elastomers.

In one preferred embodiment the resilient sealing member 26 has a hardness between about 50 and 85 on a shore A scale and the resilient collecting tube 14 has a hardness between 30 and 50 on a shore D scale, provided that the sealing member is softer than the resilient collecting tube.

In a preferred embodiment the resilient sealing member 26 has a hardness of between about 65 and 75 shore A and still more preferably of about 70 shore A.

The degree of resiliency of the collecting tube 14 may be chosen in part based on the degree of retention force required at the retention edge. In some cases, the collecting tube may be resilient enough and the retention edge sharp enough to make an indentation in the inside surface of the tube creating additional retention force. For sap collection system the collecting tube has a hardness of between 30 and 50 shore D and preferably between about 35 and 45 shore D.

The resilient collection tube 14 may lose some resiliency along its length as it is inserted as a result of distending forces created by the retention structures. Thus, the resiliency of the tube may not be uniform along its length. For example, the resiliency may be greater near the proximal barb since the part of the tube before the retention point of the proximal barb has not been fully stretched by the barb. The extra resiliency near the proximal barb may affect the curvature of the tube immediately after the first retention point and this curvature can be exploited to create a better seal while avoiding interference with the retention function of the barb by adjusting the relative heights of the sealing flanges as is further described below.

The height of the resilient sealing member 26, before compression by the collecting tube 14, preferably exceeds that of the sealing flanges, for example, sealing flanges 28 and 29. However, the height of the sealing flanges is enough to prevent displacement of the sealing member when the tube is inserted or displaced. In one embodiment the height of the sealing flanges is at least half the height of the resilient member but less than the height of the resilient member. By height of the resilient member it is meant the distance from the outer surface of the connector body 12 to the tip of the uncompressed resilient sealing member 26.

The height of the sealing flanges in relation to the height of the retention structures can contribute to minimize the impact of the sealing arrangement on the retention function of the retention structures. For example, the height of sealing flange 28, adjacent to the proximal barb, in relation to the height of proximal barb is sufficiently small to avoid contact with the tube once the latter is inserted or at least, if there is contact, to minimally disturb the curvature of the tube to avoid or to minimize interference with the retention function of the barb at retention edge or point 24. Furthermore, minimal interference of the flanges with the curvature of the collecting tube 14 optimizes the pressure on the resilient sealing member. In an embodiment, the flange 29, distant to the proximal barb, is lower than the flange 28. In yet another arrangement, the flange 29 is lower than the flange 28 and the distal barb is higher at its greatest diameter (at the retention point) than the proximal barb at its greatest diameter (at the retention point). This geometry or arrangement has been found in one embodiment to optimize both the sealing effect and the retention of the tube on the connector.

It will be appreciated that flanges of substantially equal heights may also be used when the sealing member is positioned close to the smallest curvature of the resilient collecting tube.

The retention structure may also serve as the positioning means and/or as a sealing flange. In one example as shown in FIG. 7, the sealing member 26 is placed after the last retention structure in this case after the distal barb. The proximity of the tip of the tube may provide additional curvature to the tube after the retention point 24 thereby enabling the positioning of the sealing member closer to the retention structure. However, the same arrangement (retention structure serving as the sealing flange) can also be used between two barbs with the proximal barb serving as a sealing flange as shown in FIG. 5. It will be appreciated that several configurations of sealing flanges arrangements can be used on a single connector comprising more than one sealing member.

It will be further appreciated that the relative height of the retention structure(s) and sealing flanges as well as their longitudinal position along the length of tube coupling end 16 will depend in part on the resiliency properties of the resilient collecting tube 14.

When the curvature of the tube is sufficiently pronounced, as it may be after the last retention structure near the tip of the tube, it may be possible to create a good seal with a sealing member having a height that is less than the retention structure (for example, less than the maximum height of the distal barb in FIG. 7).

In one embodiment the outer part of the connector body 12, that forms part of the housing (floor of the housing) with sealing flanges 28 and 29 for the resilient sealing member, is flat when viewed in cross-section such as in FIG. 3. This arrangement allows the resilient sealing member to fill the housing cavity created by the sealing flanges when compressed by the tube and provides a better seal. However, the floor of the housing may also have other conformation such as a groove shape for example. The groove may have a half-moon (or semicircular) shape.

In an embodiment, sealing flange 28 is adjacent to the proximal barb and, when measured from the connector body, the height of the proximal barb (at the diameter of the retention point) is about 1.5 to 2.5 times the height of sealing flange 28. In one embodiment, this ratio is approximately 2.0. The height of sealing flange 28 is between about 1.2 and 1.7 times the height of sealing flange 29 (in other words slightly higher). The distance between the center of the resilient sealing member 26 (such as an O-ring) and the end facing the flanges of the proximal barb is between about 1.5 to 4 times the height of flange 28. The height of the resilient sealing member 26 is between about 1.2 and 2 times the height of flange 28. In an embodiment the sealing member 26 is closer to the proximal barb than the distal barb.

In a preferred embodiment the sealing member is resistant to disinfecting solutions such as isopropyl alcohol (isopropyl alcohol 70% for example) or other disinfectants that are used in sap collection systems maintenance.

In one exemplary embodiment of the invention, the connector is a spout comprising two barbs circumferentially surrounding the connector body 12 and wherein the resilient sealing member is an O-ring disposed between the two barbs. Such spouts may be used in sap collection systems operating under vacuum. For example, such spouts may be used to collect sap from maple trees in harsh climates where temperature variations cause significant thermal stresses on the spouts and resilient collecting tubes.

Figure 9:
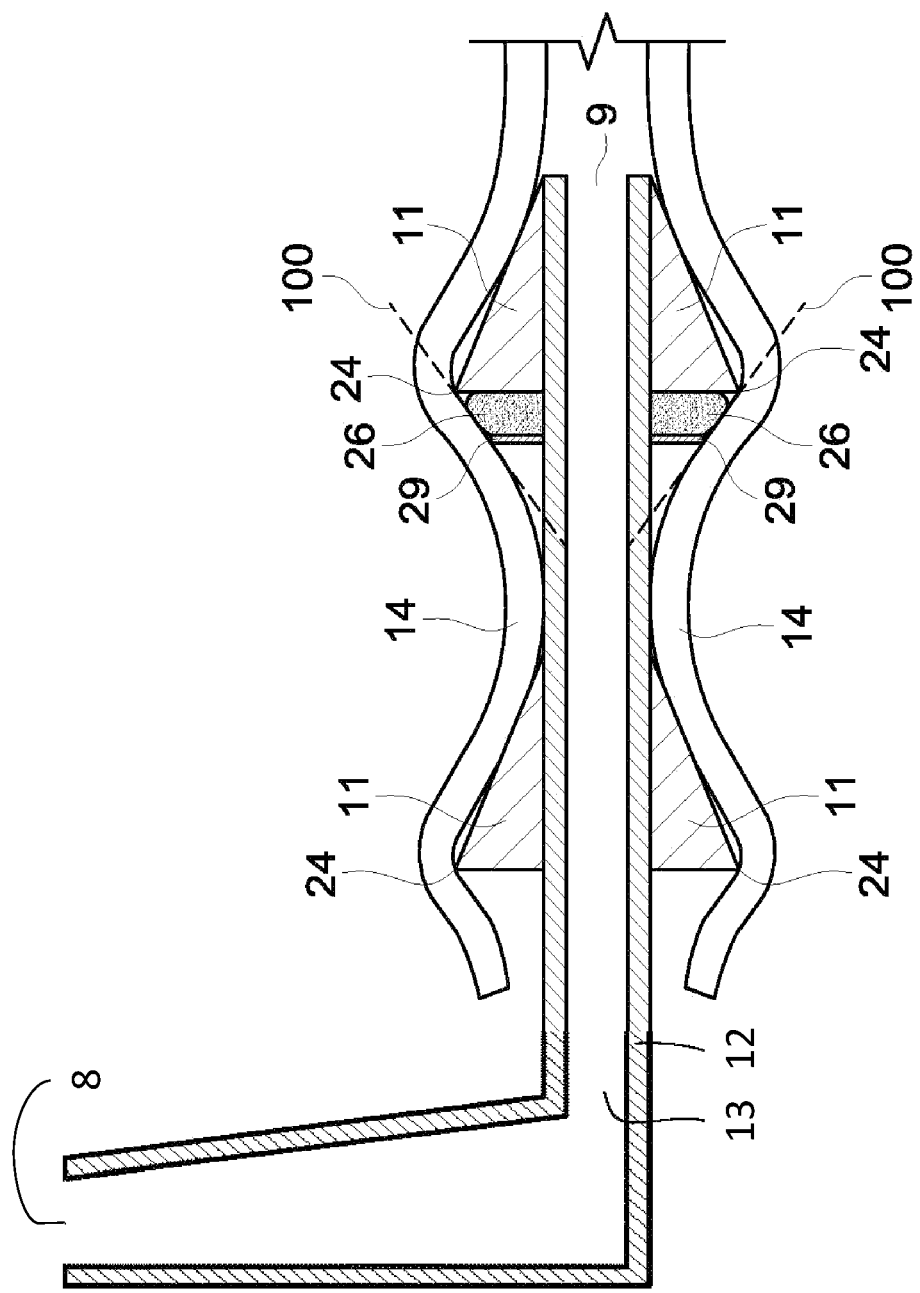
FIG. 9 is a cross-section view of a connector shown as a spout in accordance with an embodiment of the invention.

In one exemplary embodiment of the invention shown in FIG. 9, it was found that by providing a sealing member with shore hardness smaller than that of the tube and providing sealing flanges having a height smaller than the height of the barb and in preferred embodiments having unequal heights forming a slope substantially matching a sealing line of contact 100, a better seal than that obtained with connectors of the prior art can be obtained without interfering with the retention function of the retention edge.

Spouts for sap collection are typically made by injection molding. In one embodiment the connector is made of nylon but other thermoplastics may also be used (polycarbonate for example). The injection molding process produces what are called "parting" lines which are very small often less than 0.1 mm in height and protruding from the body of the molded spout at specific planes for example parallel to the length of the connector body. These parting lines, while very small, may contribute to the formation of micro-fissures on the internal face of the collecting tube when the tube is inserted over the connector thereby causing residual air leakage (loss of vacuum) especially when the tube ages and loses its resiliency. The connector of the present invention prevents leakages caused by the micro-fissures.

In another embodiment the barbs may be formed by joining steel parts to form a cavity within an injection mold. Such "steel on steel" barb cavity forming parts results in a sharper retention edge than barb that are molded by forming the cavity of the barb by electrolysis (metal cutting). Therefore, in one embodiment there is provided a connector of which the retention structures are molded in steel on steel cavity parts.

In one preferred embodiment where the connector is a sap collecting spout having dimensions typical of spouts used for maple sap collection (typical spouts having 5/16", 19/64" or 7/16" diameters for example) exemplified in FIG. 5, the sealing flange 29 serves as a second sealing flange and has a height of between about 0.65 mm and 0.75 mm, the proximal barb, which also serves as a first sealing flange in the arrangement depicted in FIG. 5, at its greatest diameter has a height of 0.9 mm and the sealing member 26 is an O-ring having a thickness (height) of 1 mm from the connector body 12 and is made of silicone. All heights are measured from the surface of the connector body 12. The O-ring has preferably a shore A hardness of about 70 while the collecting tube has a shore D hardness of around 37 to around 42. This specific example provides excellent results when used in sap collecting under vacuum. The distance between barb and sealing flange 29 is approximately 1.2 mm and the O-ring has a width of approximately 1.0 mm.

In this example, the sealing angle 102 between the sealing line of contact 100 and the long axis of the conduit 13 is between about 4.5 and 7.5 degrees and more preferably about 6 degrees. It has been found that when the diameter expending member 11 serves as a sealing flange, the angle can be small (shallow) without interfering with the retention function or retention edge 24. Without wishing to be limited by theory, the curvature of the resilient tube 14 is small enough immediately after the retention edge 24 and allows for a shallow sealing angle. At the same time the force exerted by the resilient constriction of the tube 14 is large at this initial curvature point. Therefore, this arrangement enables a particularly good seal.

The curvature of the resilient collecting tube 14 approximates a sigmoidal shape from the retention edge to the region where the tube has regained or almost regain its original diameter. The embodiment where the barb serves as a sealing flange takes advantage of the sealing force generated by the tube at 'top' of the sigmoid near the retention edge.

Figure 8:
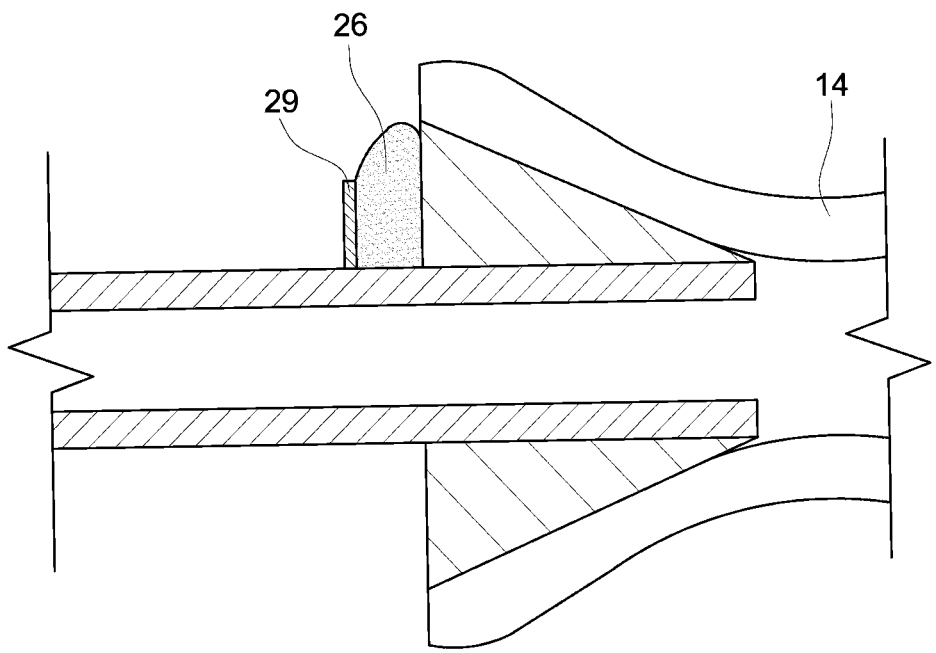
FIG. 8 is a cross-section view of a connector in accordance with another embodiment of the invention.

This particular arrangement also allows insertion of the resilient collecting tube 14 on the connector without displacing the sealing member 26 away from the housing formed by the sealing flange 29 and the barb. In fact, positioning of the resilient sealing member close to the diameter expanding member 11 allows the use of a sealing member with a greater height since the tip of the collecting tube travels in an upward direction, as shown in FIG. 8, before constricting and compressing the resilient sealing member 26, thereby reducing the lateral displacement of the sealing member.

The sealing member 26 may be mechanically inserted on the connector after the manufacture of the connector. Alternatively, the sealing member may be over-molded on the connector by an injection molding procedure and using a material that is resilient after the molding process. Depending on the material of the connector it may be possible to "bind" or "glue" the sealing member onto the connector during the over-molding process.

Preferably the sealing member is less prone to damage or changes in its physico-chemical properties than the collecting tube. For example, the sealing member is preferably less prone than the collecting tube to changes in its resiliency due to the environmental conditions to which the connector is exposed.

Tests were performed in which the resilient collecting tube was first inserted over end 16 and then vacuum efficiency was tested in three sets of conditions. In the first set of tests the resilient collecting tube was inserted on a connector of the prior art and vacuum efficiency was tested. In the second set the resilient collecting tube was inserted on a connector of the prior art and then rotated on the end 16 before testing for vacuum efficiency. The rotation of the resilient collecting tube over end 16 mimics the dynamics of the connector-tube instabilities in real environments over time. Resilient collecting tube inserted over spouts, for example, lose their resiliency over time and can be displaced on the connector because of the various forces on the tubing system like branches falling on tubes, wind and small animals. The test showed that this displacement clearly diminishes the efficiency of the vacuum. In the third set of conditions the resilient collecting tube was inserted over a connector of the present invention and rotated on the end 16. The connector of the invention nearly completely eliminated the loss of vacuum created by displacement of the collecting tube 14 when compared to prior art connectors.

Parameters of test:

The connector and the collecting tube 14 were rotated relative to one another at a speed of 100 rpm; Heat was applied to the tube by a heat gun near the barb (approximately 2 inches) at approximately 450° F. for 10 sec; Then the connector with the tube still connected thereon were cooled to room temperature in a water bath for 10 sec; The heating-cooling process was repeated three times; The test to assess the seal was performed by connecting the assembly (connector and tube) to a vacuum source and applying a vacuum of approximately 28 inch of Hg. Results: The connectors without the sealing arrangement of the invention exhibited significant leaks while connectors with the sealing arrangement of the invention prevented leaks even when the collecting tube was rotated or slightly displaced on the connector.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

What is claimed is:

1. A connector in a fluid collection system for fluidly connecting a resilient collecting tube thereto, the connector comprising:
   one or more fluid receiving end and one or more fluid efflux end fluidly connected through a connector body comprising a conduit having a long axis and an outer diameter,
   at least one of said one or more fluid receiving end and one or more fluid efflux end is a resilient collecting tube coupling end comprising a resilient collecting tube retention structure having at least one resilient collecting tube diameter expanding member comprising a retention edge, wherein the at least one resilient collecting tube diameter expanding member has a diameter, at the retention edge, greater than the outer diameter of the connector body, the resilient collecting tube adopting a constricting curvature on either side of the retention edge,
   a resilient sealing member,
   first and second sealing flanges to position the sealing member therebetween and having relative heights configured to define a sloping sealing line of contact that forms a sealing angle with the long axis of the conduit and enables the resilient collecting tube to sealingly compress the resilient sealing member along the sloping sealing line of contact to form a sealing contact zone and whereby the tube is free to engage the retention edge to form a retention coupling.

2. The connector of claim 1 wherein the sloping sealing line of contact substantially matches the constricting curvature of the collecting tube in the sealing contact zone.

3. The connector of claim 2 wherein the resilient sealing member has an uncompressed diameter greater than the height of the first and second sealing flanges.

4. The connector of claim 2 wherein the tube retention structure comprises two resilient collecting tube diameter expanding members, the two resilient collecting tube diameter expanding members having a first resilient collecting tube diameter expanding member proximal to a coupling end opening and having a second resilient collecting tube diameter expanding member located distal to the opening, and wherein the resilient sealing member is located between the two resilient collecting tube diameter expanding members.

5. The connector of claim 4 wherein the proximal resilient collecting tube diameter expanding member has a greatest diameter smaller than a greatest diameter of the distal resilient collecting tube diameter expanding member.

6. The connector of claim 4 wherein the first resilient collecting tube diameter expanding member is a barb.

7. The connector of claim 6 wherein the height of the barb is about 1.5 to 2.5 times the height of the first sealing flange adjacent to the barb.

8. The connector of claim 7 wherein the height of the first sealing flange is between about 1.2 and 1.7 times the height of the second sealing flange, and wherein the first sealing flange is between the second sealing flange and the barb.

9. The connector of claim 8 wherein a height of the resilient sealing member is between about 1.2 and 4 times the height of the first sealing flange.

10. The connector of claim 6 wherein the barb is the first sealing flange and collaborates with the second sealing flange and the resilient sealing member to form the sealing line of contact with the resilient collecting tube.

11. The connector of claim 10 wherein the barb has a height of about 0.9 mm and the second sealing flange has a height of between approximately 0.65 mm and 0.75 mm and the resilient sealing member has a height of approximately 1 mm.

12. The connector of claim 11 wherein the sealing angle is between approximately 4.5 and 7.5 degrees.

13. The connector of claim 10 wherein the resilient sealing member is an O-ring.

14. The connector of claim 13 wherein the O-ring is made of silicone.

15. The connector of claim 4 wherein the resilient sealing member is located after the distal resilient tube diameter expanding member.

16. A spout in a vacuum operated sap collection system for fluidly connecting a resilient collecting tube thereto, the spout comprising:
   one or more fluid receiving end and one or more fluid efflux end fluidly connected through a connector body comprising a conduit having a long axis and an outer diameter, at least one of said one or more fluid receiving end and one or more fluid efflux end is a resilient collecting tube coupling end comprising a resilient collecting tube retention structure having at least one resilient collecting tube diameter expanding member comprising a retention edge, wherein the at least one resilient collecting tube diameter expanding member has a diameter, at the retention edge, greater than the outer diameter of the connector body, the resilient collecting tube adopting a constricting curvature on either side of the retention edge, a resilient sealing member, first and second sealing flanges to position the sealing member therebetween and having relative heights configured to define a sloping sealing line of contact that forms a sealing angle with the long axis of the conduit and enables the resilient collecting tube to sealingly compress the resilient sealing member along the sloping sealing line of contact to form a sealing contact zone and whereby the tube is free to engage the retention edge to form a retention coupling.

17. The spout of claim 16 wherein the tube retention structure comprises two resilient collecting tube diameter expanding members, a first of said two resilient collecting tube diameter expanding members located proximal to a coupling end opening and a second resilient collecting tube diameter expanding member located distal to the opening, and wherein the resilient sealing member is located between the first and second resilient collecting tube diameter expanding members.

18. The spout of claim 17 wherein the first resilient collecting tube diameter expanding member is a barb and wherein the barb is the first sealing flange and collaborates with the second sealing flange and the resilient sealing member to form the sealing line of contact with the resilient collecting tube, the barb having a height of about 0.9 mm and the second sealing flange has a height of between approximately 0.65 mm and 0.75 mm and the resilient sealing member has a height of approximately 1 mm.

* * * * *